US012665681B2

(12) United States Patent
Mauer

(10) Patent No.: US 12,665,681 B2
(45) Date of Patent: Jun. 23, 2026

(54) TECHNIQUES FOR REDUCING FILTER DISTORTION IN DATA USING EMPHASIS

(71) Applicant: Intel Corporation, Santa Clara, CA (US)

(72) Inventor: Volker Mauer, London (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 18/076,831

(22) Filed: Dec. 7, 2022

(65) Prior Publication Data

US 2023/0096355 A1     Mar. 30, 2023

(51) Int. Cl.
H04B 15/00      (2006.01)
H04L 27/26      (2006.01)

(52) U.S. Cl.
CPC ......... H04B 15/00 (2013.01); H04L 27/2601 (2013.01)

(58) Field of Classification Search
CPC ... H04B 15/00; H04B 1/0475; H04L 27/2601; H04L 25/03343; H04L 27/2634; H04L 27/26524
See application file for complete search history.

(56) References Cited

U.S. PATENT DOCUMENTS 6,064,962 A  *  5/2000  Oshikiri .................. G10L 19/26
                                                    704/262
8,605,759 B1   12/2013  Wu et al.
2016/0035337 A1*  2/2016  Aggarwal ............... G06F 3/165
                                                    381/103

OTHER PUBLICATIONS

"FFT MegaCore Function User Guide," Altera Corporation, Dec. 2010, pp. 1-60.

* cited by examiner

*Primary Examiner* — Vineeta S Panwalkar
(74) *Attorney, Agent, or Firm* — InventIQ Legal LLP; Steven J. Cahill

(57)          ABSTRACT

An integrated circuit includes a filter circuit and a computation circuit that applies emphasis to a data stream in a frequency domain to reduce distortion to the data stream caused by the filter circuit. The emphasis is determined based on the distortion caused by the filter circuit. A circuit design system includes logic synthesis and optimization tools that relax parameters for a first filter circuit to generate relaxed parameters, use the relaxed parameters to generate a second filter circuit that filters data, generate an emphasis vector based on distortion in the data caused by the second filter circuit, and generate a computation circuit that applies the emphasis vector to the data to reduce the distortion in the data caused by the second filter circuit.

20 Claims, 9 Drawing Sheets

<u>100</u>

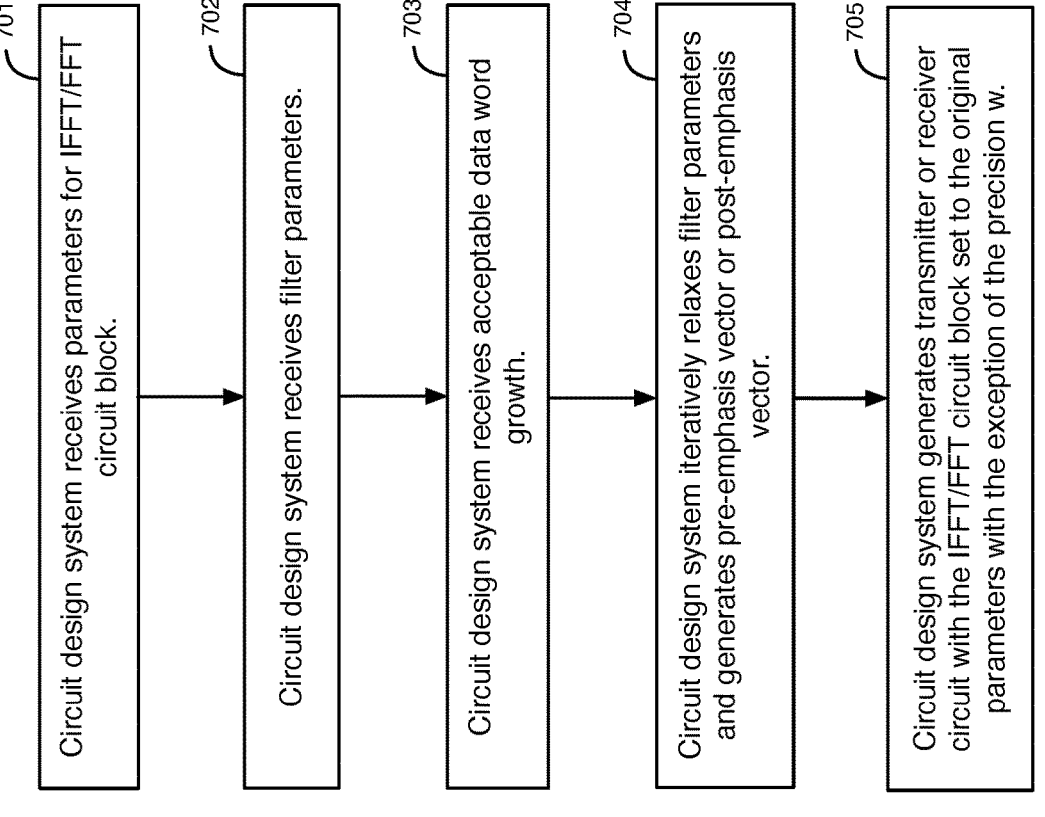

701 Circuit design system receives parameters for IFFT/FFT circuit block.

702 Circuit design system receives filter parameters.

703 Circuit design system receives acceptable data word growth.

704 Circuit design system iteratively relaxes filter parameters and generates pre-emphasis vector or post-emphasis vector.

705 Circuit design system generates transmitter or receiver circuit with the IFFT/FFT circuit block set to the original parameters with the exception of the precision w.

FIG. 7

TECHNIQUES FOR REDUCING FILTER DISTORTION IN DATA USING EMPHASIS

FIELD OF THE DISCLOSURE

The present disclosure relates to electronic circuit systems, and more particularly, to circuits, methods, and systems that reduce distortion in data caused by a filter using emphasis.

BACKGROUND

Orthogonal frequency-division multiplexing (OFDM) is a type of data transmission used in telecommunications that modulates digital data on multiple carrier signals having different frequencies. In OFDM, multiple closely spaced orthogonal carrier signals carry modulated data from a data stream in parallel. The carrier signals carrying the modulated data are transmitted from a transmitter to a receiver that demodulates the carrier signals using fast Fourier transform algorithms. OFDM enables the data rate of each carrier signal to be lower than would be required by a single stream of similar bandwidth. OFDM is used for wideband digital communication, in applications such as digital television and audio broadcasting, internet access, wireless networks, power line networks, and 4G/5G mobile communications.

BRIEF DESCRIPTION OF THE DRAWINGS

FIG. 7 is a flow chart that illustrates examples of operations that can be performed by a circuit design system to generate a transmitter circuit that uses a pre-emphasis vector or a receiver circuit that uses a post-emphasis vector, as disclosed herein.

DETAILED DESCRIPTION

Figure 1:
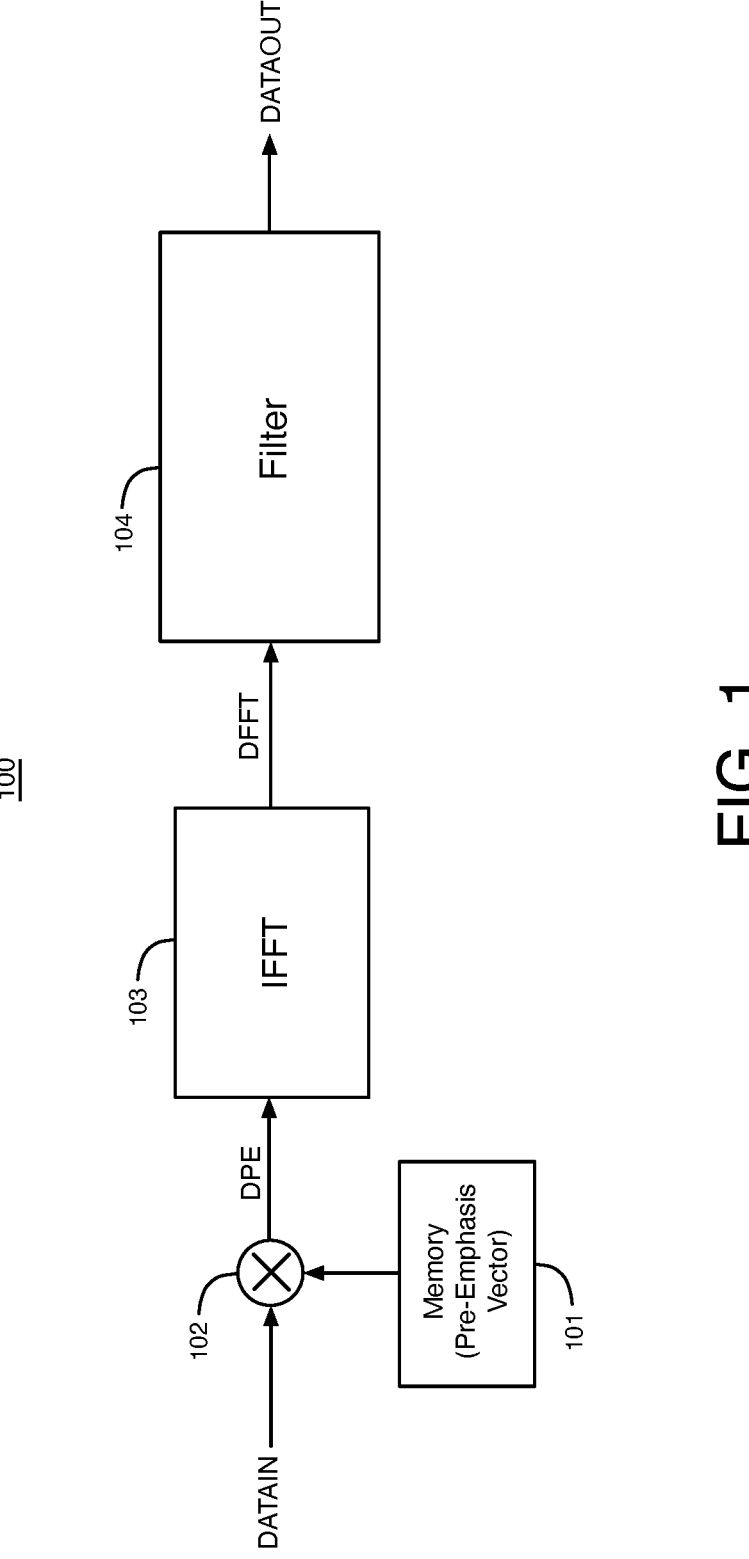
FIG. 1 is a diagram that illustrates an example of a transmitter circuit that multiplies a pre-emphasis vector to input data to compensate for distortion caused by a filter.

An orthogonal frequency-division multiplexing (OFDM) system has a transmitter with a transmit chain that typically includes an inverse fast Fourier transform (IFFT) block, followed by a filter, and then an output channel. A receiver in an OFDM system has a receive chain that includes a fast Fourier transform (FFT) block that follows a filter that receives the signals transmitted by the transmitter. In 5G OFDM systems, the filters in the transmitter and in the receiver are typically high quality filters each designed to have a large number of taps (e.g., in the range of 300 taps), because each filter has a very narrow transition bandwidth and a low passband ripple. As a result, filters have become the largest and most energy consuming blocks in OFDM systems for 5G (i.e., the fifth-generation technology standard for broadband cellular networks). The high quality filters also add undesirable latency to the transmit and receive chains. However, the specification of a filter in a data transmission system (e.g., that uses OFDM) can be relaxed to have a lower stop band and a higher passband ripple if the distortion introduced by the filter is corrected in another part of the transmit and receiver chain, as disclosed herein.

According to some examples disclosed herein, the distortion caused by a filter in a data transmission system (such an OFDM system) can be corrected in the frequency domain, before the inverse fast Fourier transform (IFFT) block in the transmitter, or after the fast Fourier transform (FFT) block in the receiver. In each of the transmitter and the receiver in some examples, the data signal is multiplied with a pre-emphasis/post-emphasis vector that contains the inverse of the distortion introduced by the filter in order to cancel out (or correct) the effects of the distortion. The high quality filter after the IFFT block in the transmitter and the high quality filter before the FFT block in the receiver can each be replaced with a lower quality filter. The distortion caused by the lower quality filter is compensated for by multiplying the pre-emphasis/post-emphasis vector with the data signal in the frequency domain. In the transmitter, the pre-emphasis vector is multiplied with the data signal before the IFFT block to compensate for distortion caused by the lower quality filter. In the receiver, the post-emphasis vector is multiplied with the data signal after the FFT block to compensate for distortion caused by the lower quality filter. Pre-emphasis and post-emphasis are also collectively referred to herein simply as emphasis.

In the IFFT and FFT blocks, input samples of the data signal are multiplied with twiddle factors, e.g. sine and cosine values read from a lookup table inside the IFFT and FFT blocks. Each of the IFFT and FFT blocks has multiple stages or radix passes where the input samples of the data signal are multiplied with the twiddle factors. In some implementations, the pre-emphasis vector is integrated into the IFFT block in the transmitter, and the post-emphasis vector is integrated into the FFT block in the receiver (e.g., in the first radix stage of the IFFT/FFT block). For a fixed channel filter, instead of storing the twiddle factors in the FFT, the twiddle factors multiplied with the pre-emphasis/ post-emphasis vectors are stored in memory, and the first radix stage of the IFFT block or the last stage of the FFT block performs multiplication with the pre-emphasis/post-emphasis vector at the same time as applying the twiddle factors. If the channel filter is reloadable, the products of the pre-emphasis/post-emphasis vector multiplied by the twiddle factors can be reloaded into the memory. Thus, the products of the pre-emphasis/post-emphasis vector multiplied by the twiddle factors are precalculated, and as a result, these multiplications do not need to be repeated as data streams through the transmitter and receiver. According to a particular implementation, a separate pre-emphasis/post-emphasis memory and multiplier are integrated into the IFFT and FFT blocks to multiply the pre-emphasis/post-emphasis vectors into the data stream.

According to other implementations, an intellectual property (IP) OFDM generator for a programmable logic circuit block receives specifications for the IFFT and FFT blocks and the filters, and from these specifications, the IP generator calculates and implements the IFFT and FFT blocks with integrated pre-emphasis (or post-emphasis) and resource-optimized low quality filters that replace the high quality filters. The OFDM IP generator allows users to enter parameters for the IFFT/FFT block (e.g., block size, precision, throughput), the filters (e.g., passband, passband ripple, stop band, stop band ripple, precision, throughput), and other blocks in the transmitter and/or receiver. The OFDM IP generator uses these parameters to generate the pre-emphasis and/or post-emphasis vectors. The OFDM IP generator can also use these parameters to create a filter with a reduced number of taps by relaxing the filter parameters, such that the combination of the pre-emphasis (or post-emphasis) mechanism and the relaxed filter still meet the filter specifications. The OFDM IP generator can use these parameters to apply the pre-emphasis or post-emphasis vector as disclosed herein. The OFDM IP generator can generate combined code for pre-emphasis/post-emphasis, IFFT/FFT blocks, and the filter.

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices that allows the transfer of information between circuits. The term "circuit" may mean one or more passive and/or active electrical components that are arranged to cooperate with one another to provide a desired function.

Figure (FIG. 1 is a diagram that illustrates an example of a transmitter circuit 100 that multiplies a pre-emphasis vector to input data to compensate for distortion caused by a filter. Transmitter circuit 100 includes a memory circuit 101 (e.g., part of a lookup table) that stores a pre-emphasis vector, a multiplier circuit 102, an inverse fast Fourier transform (IFFT) circuit block 103, and a finite impulse response (FIR) filter circuit 104. The FIR filter circuit 104 can, for example, be a low quality FIR filter circuit. Transmitter circuit 100 can be used, for example, in a 5G orthogonal frequency-division multiplexing (OFDM) system that uses FFTs to perform modulation and demodulation of data signals. Transmitter circuit 100 can be made in any type of integrated circuit (IC), such as a programmable logic IC (e.g., a field programmable gate array), a processor IC (e.g., a central processing unit), a graphics processing unit IC, an application specific IC, a memory IC, etc.

A data signal DATAIN that includes an input data stream is provided to a first input of the multiplier circuit 102. As used herein, a data stream is the data indicated by (e.g., encoded in) a series of data signals passing through multiple circuit blocks of a transmitter or receiver, such as the data indicated by data signals DATAIN, DPE, DFFT, and DATAOUT. The memory circuit 101 stores a pre-emphasis vector that indicates the inverse of the distortion introduced by the filter circuit 104 into the data signal DATAOUT in order to reduce (or cancel-out) the effects of this distortion. The memory circuit 101 provides the stored pre-emphasis vector to a second input of the multiplier circuit 102. The multiplier circuit 102 multiplies the data signal DATAIN by the pre-emphasis vector in the frequency domain to generate a signal DPE. That is, the multiplier circuit 102 multiplies the data indicated by the data signal DATAIN by the values of the pre-emphasis vector in the frequency domain to generate the values of signal DPE.

Signal DPE is provided to an input of the IFFT circuit block 103. The IFFT circuit block 103 performs an inverse fast Fourier transform (IFFT) on signal DPE to generate a modulated data stream in an output data signal DFFT. The FIR filter circuit 104 then filters the output data signal DFFT generated by the IFFT circuit block 103 to generate a filtered output data signal DATAOUT. The FIR filter circuit 104 can be a low quality filter that generates too much distortion in the output data signal to satisfy the specifications for the transmitter circuit 100 (e.g., for 5G OFDM data transmission) without pre-emphasis. For example, filter circuit 104 may not have enough taps to generate an output data signal having low distortion without pre-emphasis. Multiplying the values of the pre-emphasis vector to the data indicated by the data signal DATAIN in the frequency domain at multiplier circuit 102 compensates for (e.g., eliminates) the distortion introduced by the filter circuit 104. As a result, the output data signal DATAOUT of the transmitter circuit 100 is a high quality data signal having low distortion, for example, that satisfies the specifications of a 5G orthogonal frequency-division multiplexing (OFDM) system.

Figure 2:
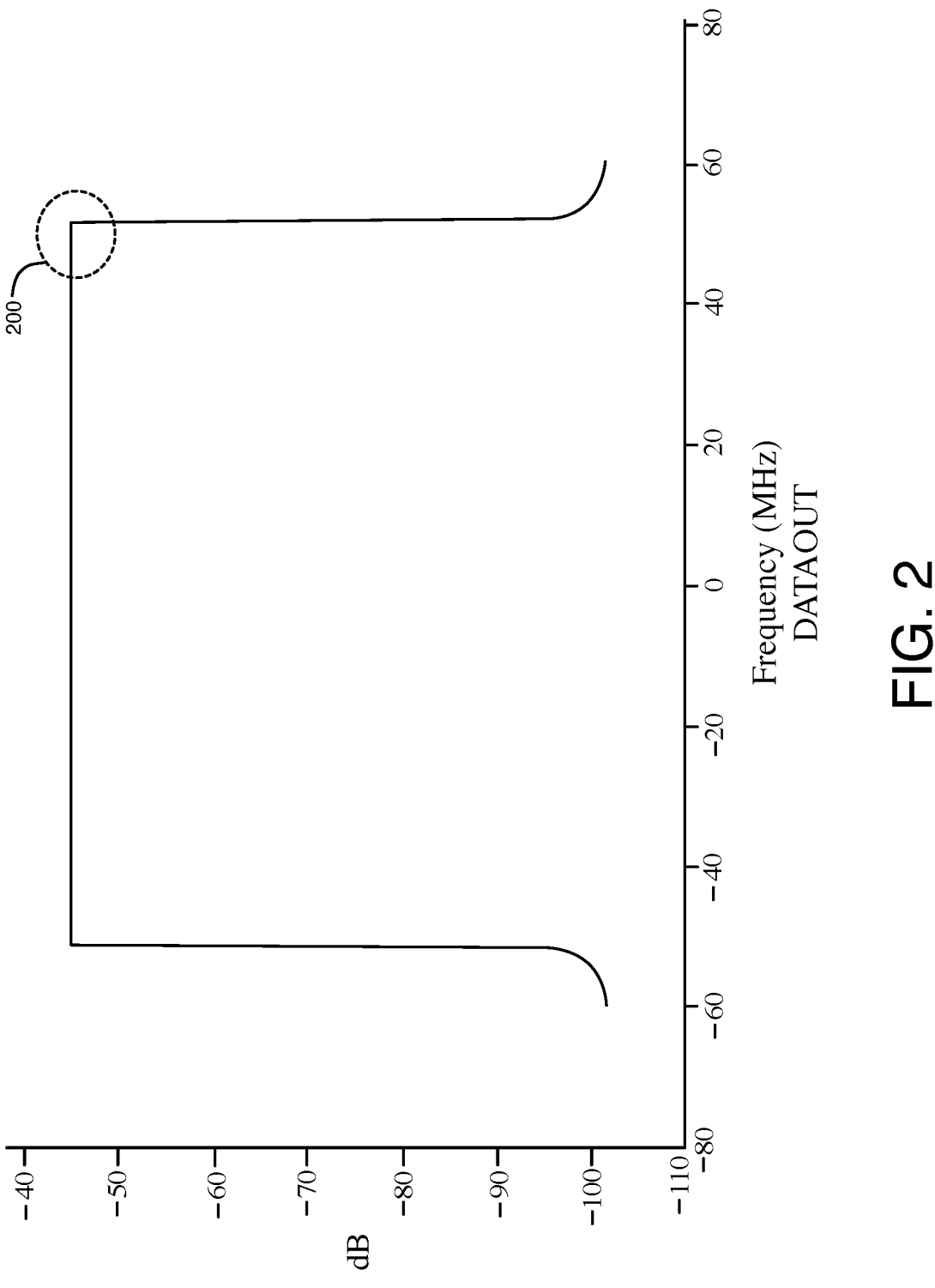
FIG. 2 is a graph that depicts an example of the frequency spectrum of the output data signal of the transmitter circuit of FIG. 1.

FIG. 2 is a graph that depicts an example of the frequency spectrum of the output data signal DATAOUT of the transmitter circuit 100 of FIG. 1. FIG. 2 depicts the entire frequency spectrum for the output data signal DATAOUT within the passband frequency range of the FIR filter circuit 104. The passband frequency range for the output data signal DATAOUT is in the range of about −43 to −45 decibels (dB) in FIG. 2. The waveform shown in FIG. 2 was generated using a FIR filter circuit 104 having 98 taps and multiplying the pre-emphasis vector with the input data signal at multiplier circuit 102. In the example of FIG. 2, the passband of the FIR filter circuit 104 falls within a frequency range of about 100 megahertz (MHz). However, it should be understood that the passband of the FIR filter circuit 104 can fall within any desired frequency range, for example, in order to satisfy the specifications of a data transmission protocol (e.g., 5G OFDM). As shown in FIG. 2, the output data signal DATAOUT of transmitter circuit 100 has a very low distortion (or no distortion) with the passband frequency range, because the pre-emphasis vector was multiplied with the input data signal DATAIN at multiplier circuit 102.

Figure 3:
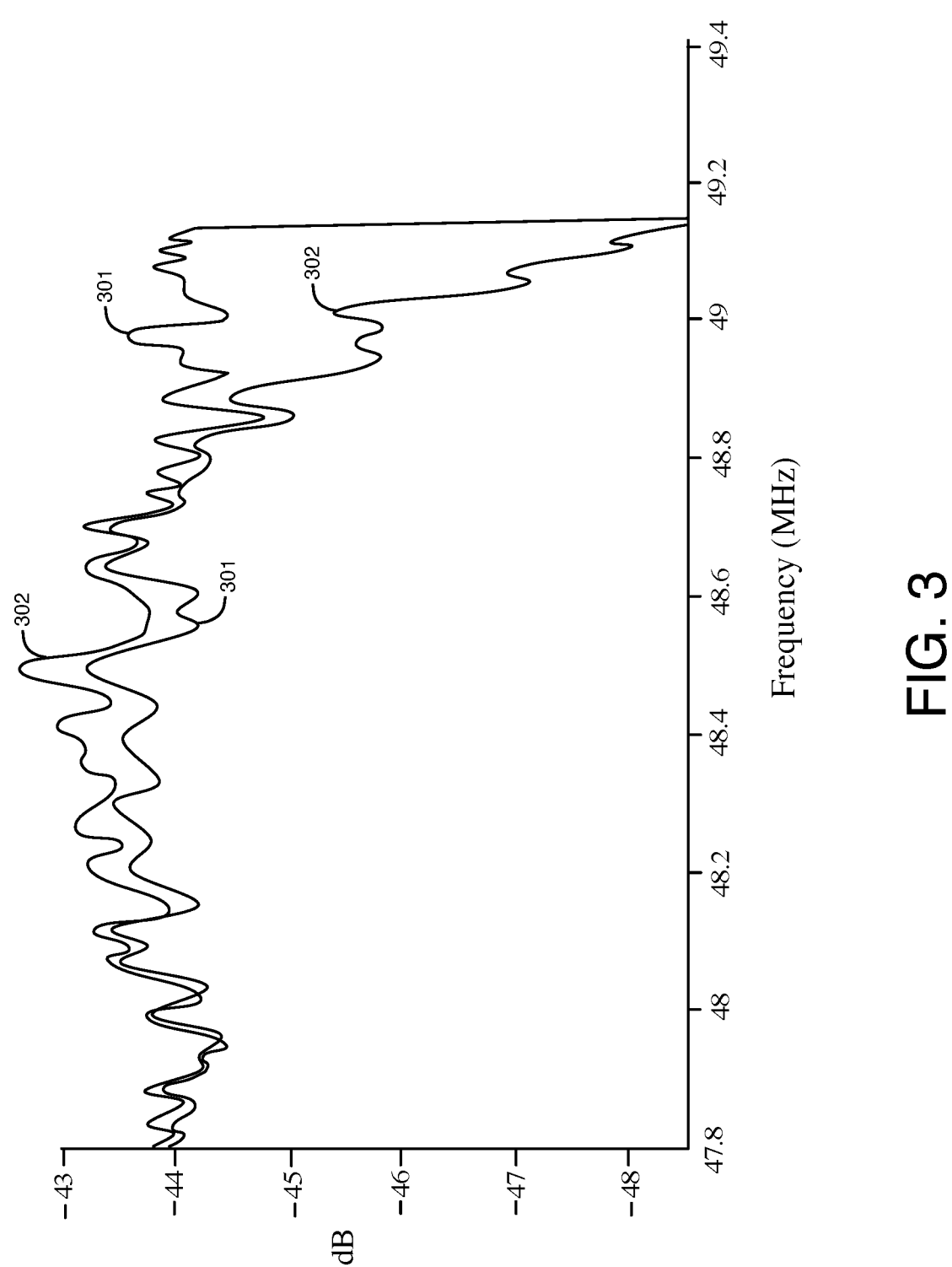
FIG. 3 is a graph that depicts further details of an example of the upper portion of the passband frequency range of the output data signal of the transmitter circuit of FIG. 1.

FIG. 3 is a graph that depicts further details of an example of the upper portion 200 of the passband frequency range of the output data signal DATAOUT of the transmitter circuit 100. The upper portion 200 of the passband frequency range is identified in FIG. 2. The waveform 301 shown in FIG. 3 is an example of the output data signal DATAOUT of the transmitter circuit 100 within the portion 200 identified in FIG. 2. As shown in FIG. 3, the waveform 301 contains some distortion within the passband frequency range that is within an acceptable range for the data transmission standard (e.g., OFDM). The waveform 301 has a sharp drop off at the upper cutoff frequency just below 49.2 MHz.

The waveform 301 for the output data signal DATAOUT of the transmitter circuit 100 is generated in a 5G OFDM system by multiplying the pre-emphasis vector with the input data signal DATAIN and using a FIR filter circuit 104 having 98 taps. The waveform 301 has a similar level of distortion and a nearly identical upper cutoff frequency as the output data signal of a 5G OFDM transmitter that filters the output data signal using a FIR filter circuit with 231 taps and that does not multiply a pre-emphasis vector to the input data signal. As examples, the measured error vector magnitude (EVM) of the output data signal of a 5G OFDM transmitter with a FIR filter having 231 taps may be 0.6596%, and the measured EVM for DATAOUT of the transmitter circuit 100 of FIG. 1 in a 5G OFDM system may be 0.6718% with pre-emphasis using a FIR filter circuit 104 having 98 taps. Thus, the transmitter circuit 100 of FIG. 1 provides a low EVM and high accuracy in the output data signal DATAOUT, even if the FIR filter circuit 104 has a smaller number of taps, because the pre-emphasis vector is multiplied to the input data signal DATAIN by multiplier circuit 102 to reduce or cancel out the effects of the distortion introduced by the FIR filter circuit 104. In some implementations of transmitter circuit 100, the number of taps of FIR filter circuit 104 can be increased to get even lower EVM values, while still using less taps than a high quality FIR filter.

FIG. 3 also depicts an example of a waveform 302 of an output data signal that was generated by a 5G OFDM transmitter that filtered the output data signal using a FIR filter circuit with 98 taps and that did not multiply a pre-emphasis vector to the data signal before filtering. As shown in FIG. 3, the waveform 302 has more distortion (i.e., ripple) within the passband frequency range than waveform 301, and waveform 302 has an undesirable passband droop below the upper cutoff frequency of the passband frequency range. As result, the waveform 302 introduces errors in the decoding of the output data signal by the receiver (e.g., an EVM of 4.3109%) in 5G.

Figure 4:
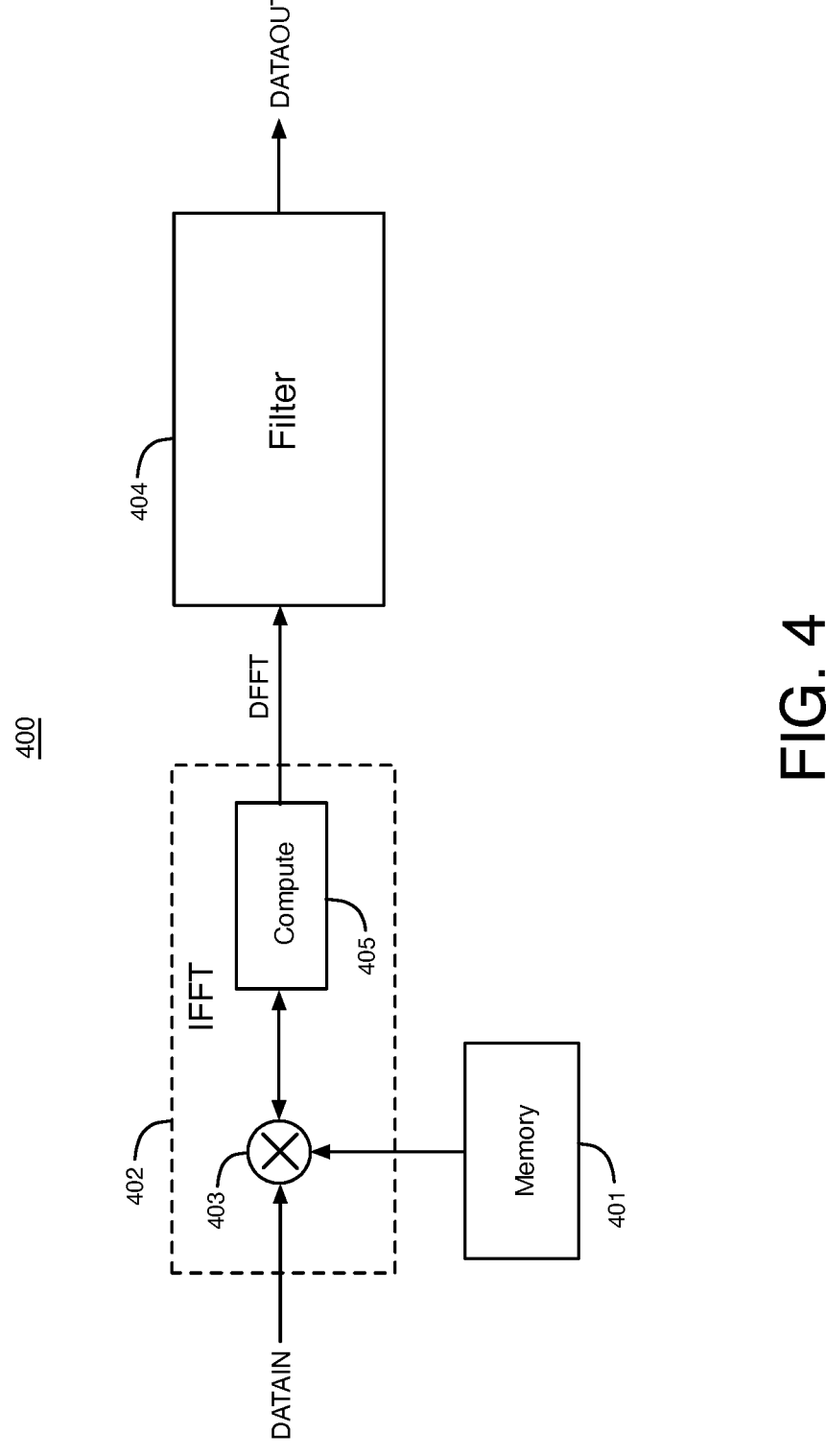
FIG. 4 is a diagram that illustrates an example of a transmitter circuit that applies values of a pre-emphasis vector multiplied with twiddle factors within an inverse fast Fourier transform block to compensate for distortion caused by a filter circuit.

FIG. 4 is a diagram that illustrates an example of a transmitter circuit 400 that applies values of a pre-emphasis vector multiplied with twiddle factors within an inverse fast Fourier transform circuit block to compensate for distortion caused by a filter circuit. Transmitter circuit 400 includes a memory circuit 401 (e.g., part of a lookup table), an inverse fast Fourier transform (IFFT) circuit block 402, and a finite impulse response (FIR) filter circuit 404. The IFFT circuit block 402 includes a compute circuit 405 and a multiplier circuit 403. The FIR filter circuit 404 can, for example, be a low quality FIR filter circuit having a small number of taps. Transmitter circuit 400 can be used, for example, in an OFDM system that uses FFTs to perform modulation and demodulation of data signals. Transmitter circuit 400 can be made in any type of integrated circuit (IC), such as a programmable logic IC (e.g., a field programmable gate array), a processor IC (e.g., a central processing unit), a graphics processing unit IC, an application specific IC, a memory IC, etc.

In the transmitter circuit 400 of FIG. 4, a data signal DATAIN that includes an input data stream is provided to an input of the inverse fast Fourier transform (IFFT) circuit block 402. The multiplier circuit 403 and the compute circuit 405 perform computations for the inverse fast Fourier transform (IFFT). As examples, the compute circuit 405 can perform Discrete Fourier Transform (DFT) computations for the IFFT, such as decimation-in-frequency (DIF) FFT and/or decimation-in-time (DIT) FFT. A typical IFFT algorithm has multiple stages, or radix passes, where input samples of the input data signal are multiplied with twiddle factors. The twiddle factors are trigonometric constant coefficients that are multiplied by the data in the course of the IFFT/FFT algorithm.

In the example of FIG. 4, values of a pre-emphasis vector are multiplied with the twiddle factors for the inverse fast Fourier transform (IFFT) performed by the IFFT circuit block 402 to generate coefficients (i.e., that are products of these multiplications). These coefficients are stored in memory circuit 401 and then are provided to the multiplier circuit 403 in the IFFT circuit block 402. If there is a filter that has sets of coefficients, then there can be one pre-emphasis vector per set, and the memory circuit 401 can store sets of the twiddle factors multiplied with corresponding values of each pre-emphasis vector. If the filter coefficients are reloadable, the memory circuit 401 is a reloadable memory (e.g., random access memory or RAM), where the twiddle factors multiplied with the corresponding values of the pre-emphasis vector can be written. The values of the pre-emphasis vector are also referred to herein as pre-emphasis values.

The multiplier circuit 403 multiplies the coefficients received from memory circuit 401 (i.e., the products of the multiplications of the pre-emphasis values and the twiddle factors) with input samples of the input data signal DATAIN in multiple stages, or radix passes, of the IFFT algorithm to generate output values. The IFFT circuit block 402 performs the IFFT algorithm with the output values of multiplier circuit 403 using compute circuit 405 to generate a modulated data stream in an output data signal DFFT. The output data signal DFFT is provided to an input of the FIR filter circuit 404.

The FIR filter circuit 404 then filters the output data signal DFFT generated by the IFFT circuit block 402 to generate an output data signal DATAOUT. The FIR filter circuit 404 can be a low quality filter that generates too much distortion in the output data signal to satisfy the specifications for the transmitter circuit 400 (e.g., for a 5G OFDM system) without pre-emphasis. For example, filter circuit 404 may not have enough taps to generate an output data signal having low distortion without pre-emphasis for 5G OFDM. Multiplying the products of the pre-emphasis values and the twiddle factors to the data samples in the frequency domain at multiplier circuit 403 compensates for (e.g., eliminates) the distortion introduced by the filter circuit 404 in the output data signal. As a result, the output data signal DATAOUT of the transmitter circuit 400 is a high quality data signal having low distortion, for example, that satisfies the requirements of a 5G orthogonal frequency-division multiplexing (OFDM) system.

Figure 5:
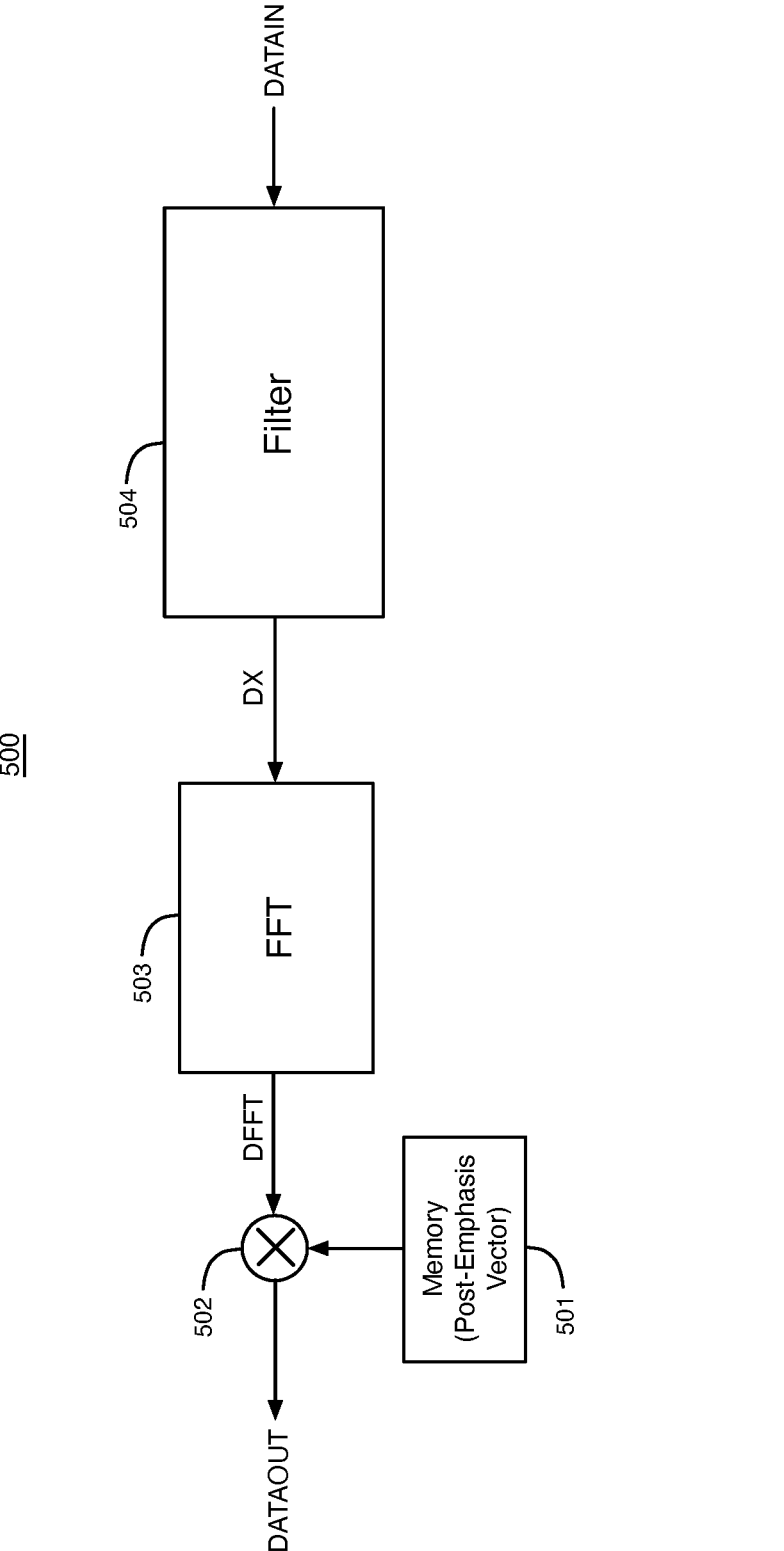
FIG. 5 is a diagram that illustrates an example of a receiver circuit that multiplies a post-emphasis vector to a data stream to compensate for distortion caused by a filter.

FIG. 5 is a diagram that illustrates an example of a receiver circuit 500 that multiplies a post-emphasis vector to a data stream to compensate for distortion caused by a filter circuit. Receiver circuit 500 includes a memory circuit 501 (e.g., part of a lookup table) that stores the post-emphasis vector, a multiplier circuit 502, a fast Fourier transform (FFT) circuit block 503, and a finite impulse response (FIR) filter circuit 504. The FIR filter circuit 504 can, for example, be a low quality FIR filter circuit. Receiver circuit 500 can be used, for example, in a 5G OFDM system that uses FFTs to perform modulation and demodulation of data signals. Receiver circuit 500 can be made in any type of integrated circuit (IC), such as a programmable logic IC (e.g., a field programmable gate array), a processor IC (e.g., a central processing unit), a graphics processing unit IC, an application specific IC, a memory IC, etc.

An input data signal DATAIN containing a modulated data stream is provided to an input of the FIR filter circuit 504. The input data signal DATAIN may, for example, be transmitted from transmitter circuit 100 or 400. The FIR filter circuit 504 filters the input data signal DATAIN to generate a filtered output data signal DX. The FIR filter circuit 504 can be a low quality filter (e.g., having a smaller number of taps) that generates too much distortion in the data signal DX to satisfy the specifications for the receiver circuit 500 (e.g., for a 5G OFDM system) without post-emphasis. The FFT circuit block 503 performs a fast Fourier transform (FFT) on data samples of filtered data signal DX to generate a demodulated data stream in an output data signal DFFT. Output data signal DFFT is provided to a first input of the multiplier circuit 502.

The memory circuit 501 stores a post-emphasis vector that contains the inverse of the distortion introduced by the filter circuit 504 into the data signal DX in order to cancel out or reduce the effects of this distortion. The memory circuit 501 provides the stored post-emphasis vector to a second input of the multiplier circuit 502. The multiplier circuit 502 multiplies the data signal DFFT by the post-emphasis vector in the frequency domain to generate an output data signal DATAOUT. That is, the multiplier circuit 502 multiplies the data indicated by the data signal DFFT by the values of the post-emphasis vector in the frequency domain to generate the values of signal DATAOUT.

Multiplying the values of the post-emphasis vector with the data indicated by the data signal DFFT in the frequency domain at multiplier circuit 502 compensates for (e.g., eliminates) the distortion introduced by the filter circuit 504. As a result, the output data signal DATAOUT of the receiver circuit 500 is a high quality data signal having low distortion, for example, that satisfies the specifications of a 5G OFDM system.

Figure 6:
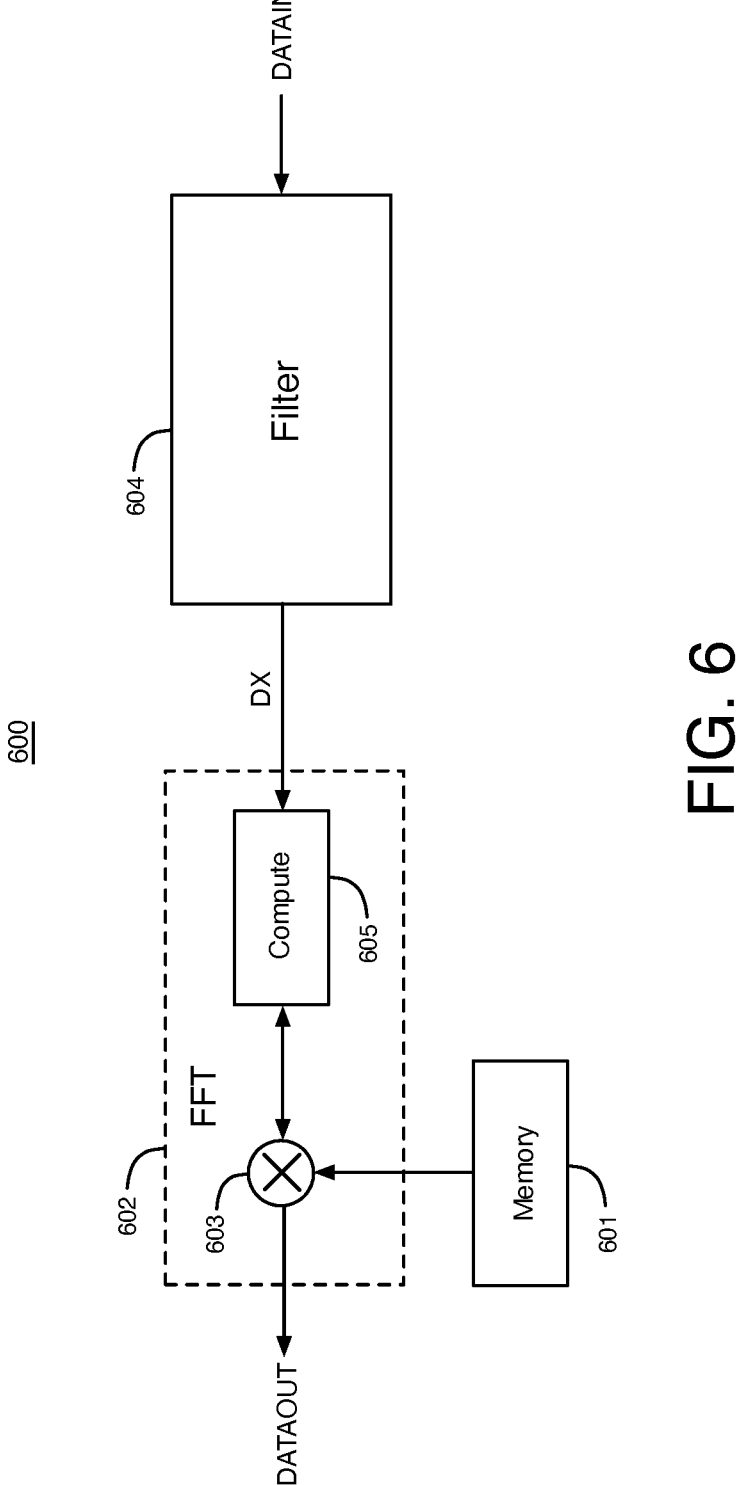
FIG. 6 is a diagram that illustrates an example of a receiver circuit that applies values of a post-emphasis vector multiplied with twiddle factors within a fast Fourier transform block to compensate for distortion caused by a filter circuit.

FIG. 6 is a diagram that illustrates an example of a receiver circuit 600 that applies values of a post-emphasis vector multiplied with twiddle factors within a fast Fourier transform circuit block to compensate for distortion caused by a filter circuit. Receiver circuit 600 includes a memory circuit 601 (e.g., part of a lookup table) that stores the post-emphasis vector, a fast Fourier transform (FFT) circuit block 602, and a finite impulse response (FIR) filter circuit 604. The FFT circuit block 602 includes a compute circuit 605 and a multiplier circuit 603. The FIR filter circuit 604 can, for example, be a low quality FIR filter circuit. Receiver circuit 600 can be used, for example, in a 5G OFDM system that uses FFTs to perform modulation and demodulation of data signals. Receiver circuit 600 can be formed in any type of integrated circuit (IC), such as a programmable logic IC (e.g., a field programmable gate array), a processor IC (e.g., a central processing unit), a graphics processing unit IC, an application specific IC, a memory IC, etc.

An input data signal DATAIN containing a modulated data stream is provided to an input of the FIR filter circuit 604. The input data signal DATAIN may, for example, be transmitted from transmitter circuit 100 or 400. The FIR filter circuit 604 filters the input data signal DATAIN to generate a filtered output data signal DX. The FIR filter circuit 604 can be a low quality filter (e.g., having a smaller number of taps) that generates too much distortion in the data signal DX to satisfy the specifications for the receiver circuit 600 (e.g., for a 5G OFDM system) without post-emphasis.

The filtered output data signal DX of filter circuit 604 is provided to an input of the compute circuit 605 in the FFT circuit block 602. The FFT circuit block 602 performs a fast Fourier transform (FFT) on data samples of the filtered data signal DX to generate a demodulated data stream in an output data signal DATAOUT. The compute circuit 605 performs computations for the fast Fourier transform (FFT).

The values of the post-emphasis vector stored in memory circuit 601 are referred to herein as post-emphasis values. In the example of FIG. 6, post-emphasis values are multiplied with the twiddle factors for the fast Fourier transform (FFT) algorithm performed by the FFT circuit block 602 to generate coefficients (i.e., that are products of the multiplications). These coefficients are stored in memory circuit 601 and are provided to the multiplier circuit 603 in the FFT block 602. If filter 604 has sets of coefficients, then there can be one post-emphasis vector per set, and the memory circuit 601 can store sets of the twiddle factors multiplied with corresponding values of each post-emphasis vector. If the filter coefficients are reloadable, the memory circuit 601 is a reloadable memory (e.g., RAM), where the twiddle factors multiplied with the corresponding values of the post-emphasis vector can be written.

The multiplier circuit 603 multiplies the coefficients received from memory circuit 601 (i.e., the products of the multiplications of the post-emphasis values and the twiddle factors) with input samples of the filtered data signal DX in multiple stages, or radix passes, of the FFT algorithm. The multiplier circuit 603 generates a modulated data stream in the output data signal DATAOUT. Multiplying the products of the post-emphasis values and the twiddle factors with the data samples in the frequency domain at multiplier circuit 603 compensates for (e.g., eliminates) the distortion introduced by the filter circuit 604. As a result, the output data signal DATAOUT of the receiver circuit 600 is a high quality data signal having low distortion, for example, that satisfies the requirements of a 5G OFDM system.

In some implementations, a circuit design system can generate a transmitter or receiver circuit (e.g., an OFDM transmitter or receiver circuit) that uses a pre-emphasis or post-emphasis vector as disclosed herein with various input parameters. FIG. 7 is a flow chart that illustrates examples of operations that can be performed by a circuit design system to generate a transmitter circuit that uses a pre-emphasis vector or a receiver circuit that uses a post-emphasis vector, as disclosed herein. A transmitter circuit generated using the operations of FIG. 7 can be, for example, one of transmitter circuits 100 or 400 as disclosed herein with respect to FIGS. 1 and 4, respectively. A receiver circuit generated using the operations of FIG. 7 can be, for example, one of receiver circuits 500 or 600 as disclosed herein with respect to FIGS. 5 and 6, respectively. The transmitter and/or receiver circuit generated using the operations of FIG. 7 can be used with any data transmission protocol, such as OFDM.

Initially, the circuit design system receives input regarding the IFFT/FFT circuit block and FIR filter parameters that can include, for example, multiple FIR filters (e.g., as in a typical up or down-conversion block). The multiple FIR filters can contain a channel filter and multiple interpolation/decimation stages. In operation 701, the circuit design system receives parameters from a user for the IFFT circuit block 103 or 402 (for a transmitter circuit) or for the FFT circuit block 503 or 602 (for a receiver circuit). As examples, the parameters received in operation 701 can include the IFFT/FFT block size, a precision w, architectural options, and data throughput. In operation 702, the circuit design system receives filter parameters for the filter circuit (e.g., for FIR filter circuit 104, 404, 504, or 604) from the user. Examples of the filter parameters received in operation 702 include the passband, stopband, passband ripple, stopband suppression, precision, number of taps, and fixed coefficients/sets of coefficients/reloadable coefficients. In operation 703, the circuit design system receives an acceptable data word growth $\Delta w$ (i.e., 1 bit or more) from the user.

The circuit design system then proceeds through an optimization loop in operations 704, in which the filter parameters are relaxed, and the appropriate pre-emphasis or post-emphasis vector is calculated. In operations 704, the circuit design system iteratively relaxes the filter parameters and generates a pre-emphasis vector or a post-emphasis vector. The circuit design system calculates the maximum pre-emphasis or post-emphasis value in each iteration of the iterative process of operations 704. As the maximum pre-emphasis or post-emphasis value increases, the cost of the remaining IFFT/FFT block and FIR filter circuits increases, as the data width is extended. This cost-benefit analysis can be summarized as follows. As the filter parameters are relaxed, the pre-emphasis or post-emphasis value increases in magnitude, in particular towards the passband edges. As a result, only on the transmitter side, the data width grows before the IFFT block, causing a resource increase. However, the data width does not grow in the receiver, because the post-emphasis vector is applied after the FFT block or in the last stage of the FFT block. The circuit design system stops operations 704 when (log 2(max(pre-emphasis or post-emphasis))−precision) exceeds the user defined acceptable word growth $\Delta w$ received in operation 703. The circuit design system can, for example, create a filter with a reduced number of taps by relaxing the filter parameters, such that the combination of the pre-emphasis (or post-emphasis) vector and the relaxed filter parameters still meet specifications for the filter.

In operation 705, the circuit design system generates the transmitter or receiver circuit with the IFFT circuit block or the FFT circuit block set to the original parameters with the exception of the precision w, which is replaced with w+$\Delta w$. The original filter circuit is replaced with a new filter circuit having the relaxed filter parameters calculated using operations 704.

Figure 8:
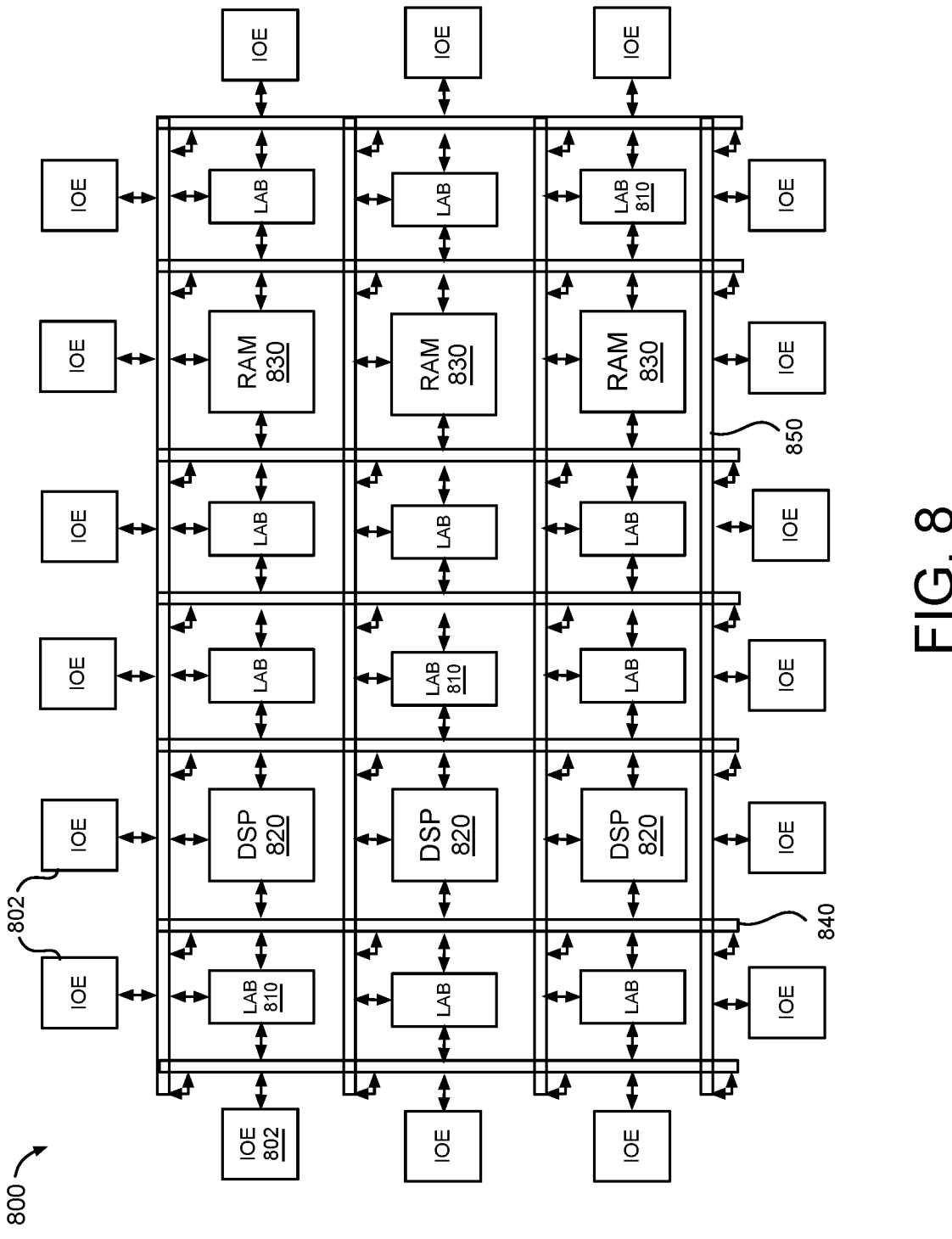
FIG. 8 is a diagram of an illustrative example of a programmable integrated circuit (IC) that can be configured to implement any one or more of the transmitter and/or receiver circuits disclosed herein.

FIG. 8 is a diagram of an illustrative example of a programmable integrated circuit (IC) 800 that can be configured to implement any one or more of the transmitter and/or receiver circuits disclosed herein. As shown in FIG. 8, the programmable integrated circuit 800 may include a two-dimensional array of functional blocks, including logic array blocks (LABs) 810 and other functional blocks, such as random access memory (RAM) blocks 830 and digital signal processing (DSP) blocks 820, for example. Functional blocks, such as LABs 810, can include smaller programmable regions (e.g., logic elements, configurable logic blocks, or adaptive logic modules) that receive input signals and perform custom functions on the input signals to produce output signals. The LABs 810 and/or the DSP blocks 820 can be configured to include one or more of the transmitter circuits and/or the receiver circuits disclosed herein with respect to any one or more of FIGS. 1 and 4-6.

In addition, the programmable integrated circuit 800 may have input/output elements (IOEs) 802 for driving signals off of programmable integrated circuit 800 and for receiving signals from other devices. Input/output elements 802 may include parallel input/output circuitry, serial data transceiver circuitry, differential receiver and transmitter circuitry, or other circuitry used to connect one integrated circuit to another integrated circuit. As shown, input/output elements 802 may be located around the periphery of the IC. If desired, the programmable integrated circuit 800 may have input/output elements 802 arranged in different ways. For example, input/output elements 802 may form one or more columns of input/output elements that may be located anywhere on the programmable integrated circuit 800 (e.g., distributed evenly across the width of the programmable integrated circuit). If desired, input/output elements 802 may form one or more rows of input/output elements (e.g., distributed across the height of the programmable integrated circuit). Alternatively, input/output elements 802 may form islands of input/output elements that may be distributed over the surface of the programmable integrated circuit 800 or clustered in selected areas.

The programmable integrated circuit 800 can also include programmable interconnect circuitry in the form of vertical routing channels 840 (i.e., interconnects formed along a vertical axis of programmable integrated circuit 800) and horizontal routing channels 850 (i.e., interconnects formed along a horizontal axis of programmable integrated circuit 800), each routing channel including at least one track to route at least one wire.

Note that other routing topologies, besides the topology of the interconnect circuitry depicted in FIG. 8, may be used. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of programmable integrated circuit 800, fractional global wires such as wires that span part of programmable integrated circuit 800, staggered wires of a particular length, smaller local wires, or any other suitable interconnection resource arrangement.

Furthermore, it should be understood that examples disclosed herein may be implemented in any type of integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Programmable integrated circuit 800 may contain programmable memory elements. Memory elements may be loaded with configuration data (also called programming data) using input/output elements (IOEs) 802. Once loaded, the memory elements each provide a corresponding static control signal that controls the operation of an associated functional block (e.g., LABs 810, DSP 820, RAM 830, or input/output elements 802).

In a typical scenario, the outputs of the loaded memory elements are applied to the gates of field-effect transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory or programmable memory elements.

The programmable memory elements may be organized in a configuration memory array consisting of rows and columns. A data register that spans across all columns and an address register that spans across all rows may receive configuration data. The configuration data may be shifted onto the data register. When the appropriate address register is asserted, the data register writes the configuration data to the configuration memory elements of the row that was designated by the address register.

Programmable integrated circuit 800 can include configuration memory that is organized in sectors, whereby a sector may include the configuration RAM bits that specify the function and/or interconnections of the subcomponents and wires in or crossing that sector. Each sector may include separate data and address registers.

It can be a significant undertaking to design and implement a user (custom) logic circuit design for an integrated circuit (IC), such as a programmable logic IC. Logic designers therefore generally use logic design systems based on computer-aided-design (CAD) tools to assist them in designing circuits for ICs. A logic design system can help a logic designer design and test complex circuits for a system. When a design is complete, the logic design system can be used to generate configuration data for electrically programming the appropriate programmable logic IC according to the user design.

Figure 9:
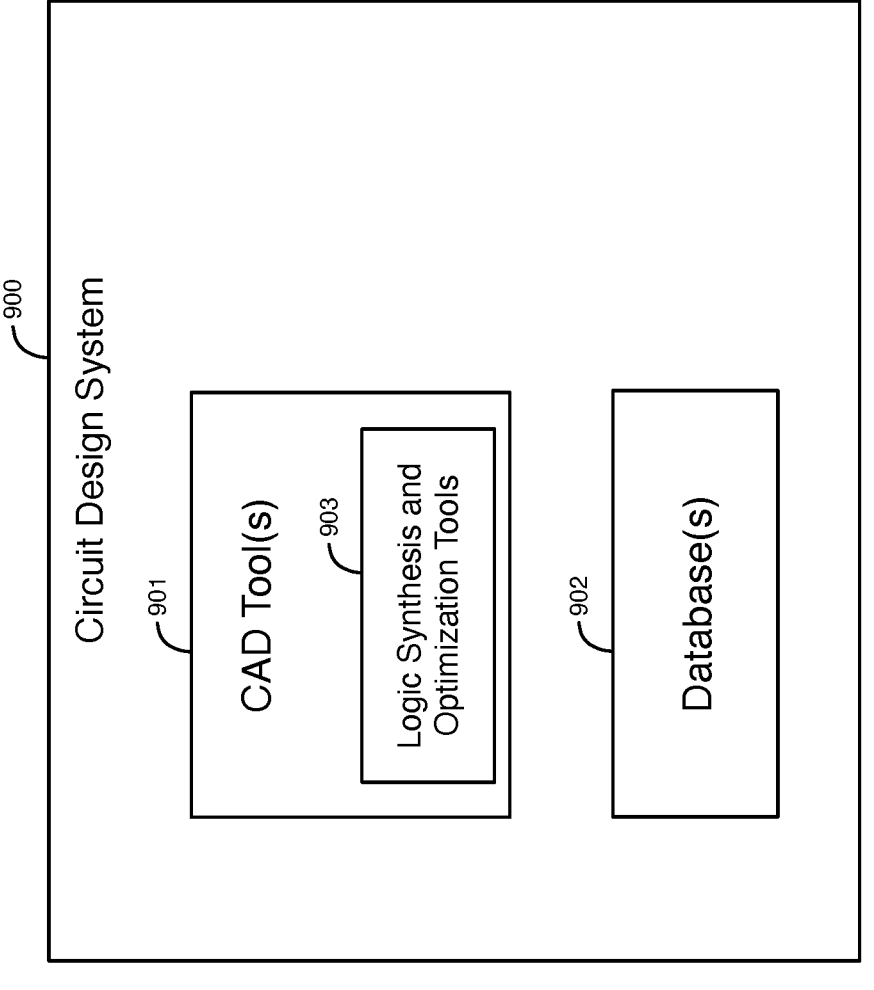
FIG. 9 shows an illustrative circuit design system that can perform functions disclosed herein.

An illustrative circuit design system 900 is shown in FIG. 9. Any of the systems and methods disclosed herein can be implemented by the circuit design system 900, such as the operations of FIG. 7. Circuit design system 900 can be implemented on integrated circuit design computing equipment. Circuit design system 900 can, for example, include one or more networked computers with processors, memory, mass storage, input/output devices, etc. System 900 may, for example, be based on one or more processors such as personal computers, workstations, etc. The processor(s) may be linked using a network (e.g., a local or wide area network). Memory in these computers or external memory and storage devices can be used to store instructions and data. Circuit design system 900 can be used to create a circuit design for any type of IC, such as a programmable logic IC.

Software-based components such as computer-aided design (CAD) tools 901 and databases 902 reside on system 900. During operation, executable software such as the software of computer aided design tools 901 runs on the processor(s) of system 900. Databases 902 are used to store data for the operation of system 900. In general, software and data may be stored in non-transitory computer readable storage media (e.g., tangible computer readable storage media).

CAD tools 901 can include logic synthesis and optimization tools 903 that perform systems and methods disclosed herein. Once the functional operation of the circuit design has been determined to be satisfactory, the logic synthesis and optimization tools 903 can generate a gate-level netlist of the circuit design, for example, using gates from a particular library pertaining to a targeted process supported by a foundry that has been selected to produce the integrated circuit. Alternatively, the logic synthesis and optimization tools 903 can generate a gate-level netlist of the circuit design using gates of a targeted programmable IC (i.e., in the logic and interconnect resources of a particular programmable IC product or product family).

The logic synthesis and optimization tools 903 can optimize the circuit design by making appropriate selections of hardware to implement different logic functions in the circuit design based on the circuit design data and constraint data entered by the logic designer. As an example, tools 903 can perform the operations of FIG. 7. As another example, the logic synthesis and optimization tools 903 can perform multi-level logic optimization and technology mapping based on the length of a combinational path between registers in the circuit design and corresponding timing constraints that were entered by the logic designer.

After logic synthesis and optimization, the circuit design system 900 can use tools such as placement, routing, and physical synthesis tools to perform physical design steps (layout synthesis operations). These tools can be used to determine where to place each gate of the gate-level netlist. These tools create orderly and efficient implementations of circuit designs for any targeted integrated circuit (e.g., for a given programmable integrated circuit such as a field-programmable gate array (FPGA)).

Software stored on the non-transitory computer readable storage media can be executed on system 900. When the software of system 900 is installed, the storage of system 900 has instructions and data that cause the computing equipment in system 900 to execute various methods (processes). When performing these processes, the computing equipment is configured to implement the functions of circuit design system 900.

The computer aided design (CAD) tools 901, some or all of which are sometimes referred to collectively as a CAD tool, a circuit design tool, or an electronic design automation (EDA) tool, may be provided by a single vendor or by multiple vendors. Tools 901 may be provided as one or more suites of tools (e.g., a compiler suite for performing tasks associated with implementing a circuit design in a programmable IC) and/or as one or more separate software components (tools). Database(s) 902 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. The shared database allows one tool to pass information to another tool. Tools may also pass information between each other without storing information in a shared database if desired.

In general, software and data for performing any of the functions disclosed herein can be stored in non-transitory computer readable storage media. Non-transitory computer readable storage media is tangible computer readable storage media that stores data and software for access at a later time, as opposed to media that only transmits propagating electrical signals (e.g., wires). The software code may sometimes be referred to as software, data, program instructions, instructions, or code. The non-transitory computer readable storage media can, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now described. Example 1 is an integrated circuit comprising: a filter circuit; and a computation circuit that applies emphasis to a data stream in a frequency domain to reduce distortion to the data stream caused by the filter circuit, wherein the emphasis is determined based on the distortion caused by the filter circuit.

In Example 2, the integrated circuit of Example 1 may optionally include, wherein the emphasis comprises an inverse of the distortion caused by the filter circuit.

In Example 3, the integrated circuit of any one of Examples 1-2 may optionally include, wherein the computation circuit comprises a multiplier circuit that multiplies the emphasis with data in the data stream in the frequency domain.

In Example 4, the integrated circuit of any one of Examples 1-3 may optionally include, wherein values that are products of the emphasis and twiddle factors are multiplied with data in the data stream during a Fourier transform performed by the computation circuit.

In Example 5, the integrated circuit of Example 4 may optionally include, wherein the values are computed prior to the computation circuit applying the emphasis to the data stream, and wherein the values are stored in a memory circuit.

In Example 6, the integrated circuit of any one of Examples 1-5 may optionally include, wherein the filter circuit and the computation circuit are part of a transmitter circuit, and wherein the emphasis comprises a pre-emphasis vector.

In Example 7, the integrated circuit of Example 6 may optionally include, wherein the computation circuit performs an inverse fast Fourier transform on the data stream, and an output signal of the computation circuit is provided to an input of the filter circuit.

In Example 8, the integrated circuit of any one of Examples 1-5 may optionally include, wherein the filter circuit and the computation circuit are part of a receiver circuit, and wherein the emphasis comprises a post-emphasis vector.

In Example 9, the integrated circuit of Example 8 may optionally include, wherein the computation circuit performs a fast Fourier transform on the data stream, and an output signal of the filter circuit is provided to an input of the computation circuit.

Example 10 is a method for reducing distortion in data caused by a filter circuit, the method comprising: filtering the data using the filter circuit to generate filtered data; and applying emphasis to the data in a frequency domain to compensate for the distortion in the filtered data using a computation circuit, wherein the emphasis is generated based on the distortion.

In Example 11, the method of Example 10 may optionally include, wherein the emphasis comprises an inverse of the distortion caused by the filter circuit.

In Example 12, the method of any one of Examples 10-11 may optionally include, wherein applying the emphasis to the data further comprises multiplying the emphasis with the data using a multiplier circuit.

In Example 13, the method of any one of Examples 10-12 may optionally include, wherein applying the emphasis to the data further comprises multiplying the data with values that are products of the emphasis and twiddle factors during a Fourier transform performed by the computation circuit.

In Example 14, the method of any one of Examples 10-13 may optionally include, wherein applying the emphasis to the data further comprises applying a pre-emphasis vector to the data prior to the filter circuit filtering the data to generate the filtered data.

In Example 15, the method of any one of Examples 10-13 may optionally include, wherein applying the emphasis to the data further comprises applying a post-emphasis vector to the data after the filter circuit filters the data to generate the filtered data.

Example 16 is a circuit design system configured to implement a circuit design tool for generating a circuit design for an integrated circuit, wherein the circuit design system comprises: logic synthesis and optimization tools that relax parameters for a first filter circuit to generate relaxed parameters, wherein the logic synthesis and optimization tools use the relaxed parameters to generate a second filter circuit that filters data, wherein the logic synthesis and optimization tools generate an emphasis vector based on distortion in the data caused by the second filter circuit, and wherein the logic synthesis and optimization tools generate a computation circuit that applies the emphasis vector to the data to reduce the distortion in the data caused by the second filter circuit.

In Example 17, the circuit design system of Example 16 may optionally include, wherein the relaxed parameters comprise a number of taps, and wherein the logic synthesis and optimization tools reduce the number of taps in the second filter circuit compared to the first filter circuit.

In Example 18, the circuit design system of any one of Examples 16-17 may optionally include, wherein the logic synthesis and optimization tools iteratively relax the parameters by calculating a maximum value of the emphasis vector in each iteration of a set of iterations until a maximum acceptable word growth for the data is reached.

In Example 19, the circuit design system of any one of Examples 16-18 may optionally include, wherein the logic synthesis and optimization tools generate a multiplier circuit that multiplies the emphasis vector with the data to reduce the distortion in the data caused by the second filter circuit.

In Example 20, the circuit design system of any one of Examples 16-19 may optionally include, wherein the logic synthesis and optimization tools generate the computation circuit that multiplies the data with values that are products of the emphasis vector multiplied with twiddle factors of a Fourier transform performed by the computation circuit.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:
1. An integrated circuit comprising:
a filter circuit; and
a computation circuit that applies emphasis to a data stream in a frequency domain to reduce distortion to the data stream caused by the filter circuit, wherein the emphasis is determined based on the distortion caused by the filter circuit, wherein the filter circuit and the computation circuit are part of a transmitter circuit, and wherein the emphasis comprises a pre-emphasis vector.
2. The integrated circuit of claim 1, wherein the emphasis comprises an inverse of the distortion caused by the filter circuit.

3. The integrated circuit of claim 1, wherein the computation circuit comprises a multiplier circuit that multiplies the emphasis with data in the data stream in the frequency domain.

4. The integrated circuit of claim 1, wherein first values that are products of second values of the pre-emphasis vector and twiddle factors are multiplied with data in the data stream during an inverse Fourier transform performed by the computation circuit to generate an output data signal.

5. The integrated circuit of claim 4, wherein the first values are computed prior to the computation circuit applying the emphasis to the data stream, and wherein the first values are stored in a memory circuit.

6. The integrated circuit of claim 4, wherein the filter circuit filters the output data signal generated by the computation circuit.

7. The integrated circuit of claim 1, wherein the computation circuit performs an inverse fast Fourier transform on the data stream, and an output signal of the computation circuit is provided to an input of the filter circuit.

8. The integrated circuit of claim 1 further comprising:

a multiplier circuit that multiplies data in the data stream by the pre-emphasis vector in the frequency domain to generate a data signal.

9. The integrated circuit of claim 8, wherein the computation circuit performs an inverse fast Fourier transform on the data signal to generate a modulated data stream in an output signal that is provided to an input of the filter circuit.

10. A method for reducing distortion in data caused by a filter circuit, the method comprising:

filtering the data using the filter circuit to generate filtered data; and applying emphasis to the filtered data in a frequency domain to compensate for the distortion in the filtered data using a computation circuit by applying a post-emphasis vector to the filtered data after the filter circuit filters the data to generate the filtered data, wherein the emphasis is generated based on the distortion.

11. The method of claim 10, wherein the emphasis comprises an inverse of the distortion caused by the filter circuit.

12. The method of claim 10, wherein applying the emphasis to the filtered data further comprises multiplying the post-emphasis vector with the filtered data using a multiplier circuit.

13. The method of claim 10, wherein applying the emphasis to the filtered data further comprises multiplying the filtered data with first values that are products of second values of the post-emphasis vector and twiddle factors during a Fourier transform performed by the computation circuit.

14. The method of claim 10, wherein applying the emphasis to the filtered data further comprises performing a fast Fourier transform on the filtered data signal to generate a demodulated data stream in an output data signal.

15. The method of claim 10, wherein the filter circuit and the computation circuit are part of a receiver circuit.

16. A circuit design system configured to implement a circuit design tool for generating a circuit design for an integrated circuit, wherein the circuit design system comprises:

logic synthesis and optimization tools that relax parameters for a first filter circuit to generate relaxed parameters, wherein the logic synthesis and optimization tools use the relaxed parameters to generate a second filter circuit that filters data, wherein the logic synthesis and optimization tools generate an emphasis vector based on distortion in the data caused by the second filter circuit, and wherein the logic synthesis and optimization tools generate a computation circuit that applies the emphasis vector to the data to reduce the distortion in the data caused by the second filter circuit.

17. The circuit design system of claim 16, wherein the relaxed parameters comprise a number of taps, and wherein the logic synthesis and optimization tools reduce the number of taps in the second filter circuit compared to the first filter circuit.

18. The circuit design system of claim 16, wherein the logic synthesis and optimization tools iteratively relax the parameters by calculating a maximum value of the emphasis vector in each iteration of a set of iterations until a maximum acceptable word growth for the data is reached.

19. The circuit design system of claim 16, wherein the logic synthesis and optimization tools generate a multiplier circuit that multiplies the emphasis vector with the data to reduce the distortion in the data caused by the second filter circuit.

20. The circuit design system of claim 16, wherein the logic synthesis and optimization tools generate the computation circuit that multiplies the data with values that are products of the emphasis vector multiplied with twiddle factors of a Fourier transform performed by the computation circuit.

* * * * *